Dec. 30, 1924.
G. REISINGER
BUMPER FOR VEHICLES
Filed March 27, 1924
1,521,046
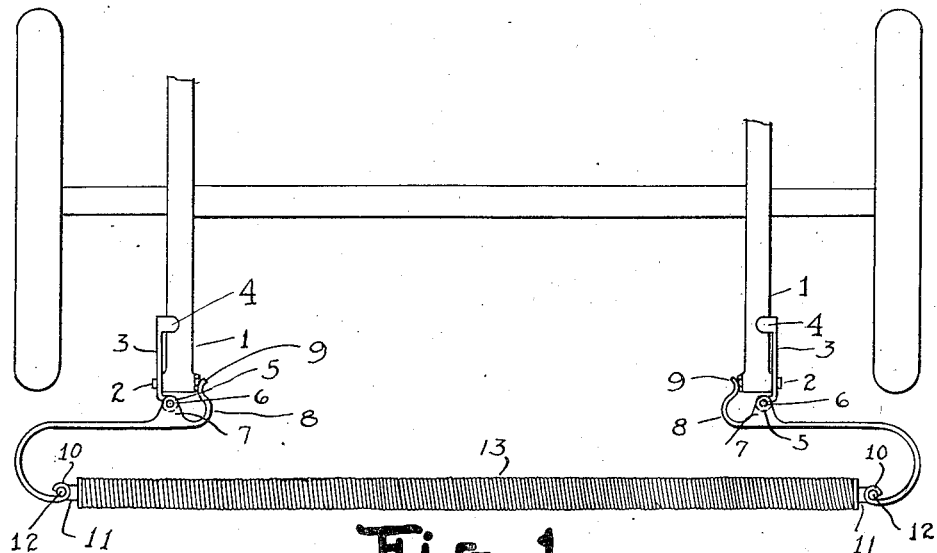
Fig. 1
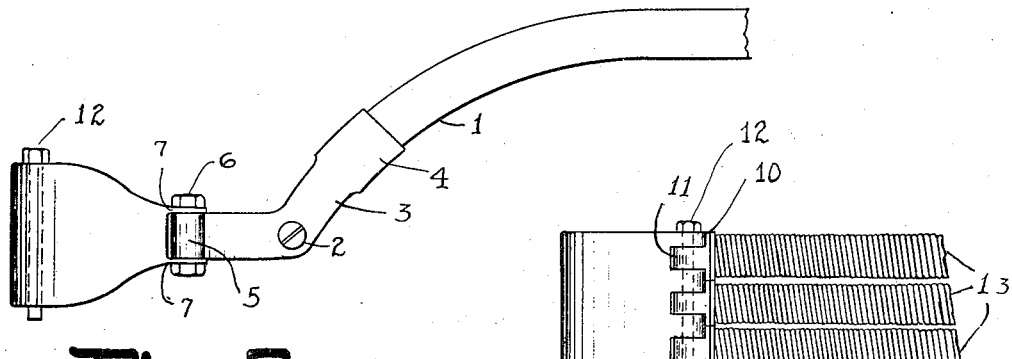
Fig. 2
Fig. 3
INVENTOR.
George Reisinger
BY
HIS ATTORNEYS.

Patented Dec. 30, 1924.

1,521,046

UNITED STATES PATENT OFFICE.

GEORGE REISINGER, OF ROCHESTER, NEW YORK.

BUMPER FOR VEHICLES.

Application filed March 27, 1924. Serial No. 702,399.

*To all whom it may concern:*

Be it known that I, GEORGE REISINGER, a citizen of the United States, and resident of Rochester, in the county of Monroe and State of New York, have invented certain new and useful Improvements in Bumpers for Vehicles, of which the following is a specification.

The present invention relates to bumpers for vehicles and an object thereof is to provide a longitudinally expansible impact member and supporting means therefor which when impinging on an object will move to expand the longitudinally expansible impact member. A further object of the invention is to provide a longitudinally expansible and laterally flexible impact member and pivotally mounted supporting arms connected by said member and movable when impinged on by an object to expand the impact member.

To these and other ends, the invention consists of certain parts and combinations of parts, all of which will be hereinafter described; the novel features being pointed out in the appended claims.

In the drawings:

Fig. 1 is a plan view of a bumper constructed in accordance with this invention, showing its connection with the longitudinally extending beams of a motor vehicle;

Fig. 2 is a side view of the bumper attached to the vehicle beams; and

Fig. 3 is a detail sectional view showing the connection between a supporting arm and the longitudinally expansible impact member.

Referring more particularly to the embodiment of the invention herein illustrated, 1 indicates the side beams of a motor vehicle, each of which, as is customary, has a shackle bolt 2 at its forward end. On this shackle bolt an attaching plate 3 may be supported. This attaching plate, in this instance, extends rearwardly and upwardly from the shackle bolt and has two arms 4 which lie above and below the side bar or beam. The attaching plate also extends forwardly and in front of the vehicle beam, its forward end being rolled to form an eye 5 and through this eye a pivot pin 6 extends. Secured by this pivot pin is a supporting arm which, in this instance, has two ears 7 lying one above and the other below the eye 5 and having the pivot bolt 6 passed therethrough. This supporting arm may also have a portion 8 extending inwardly from the pivot and bent rearwardly to provide an abutment 9 which cooperates with the inner side of the side bar 1 adjacent the shackle bolt 2 to limit the supporting arm in one direction. The supporting arm may also extend outwardly from the pivot 6 thence forwardly and then inwardly, its extreme end being rolled at 10 and formed with a plurality of slots 11 extending through such rolled portion. A pivot bolt 12 extends through said rolled portion across the slots and serves for securing one end of a plurality of impact members 13.

These impact members are formed of coil springs and have two characteristics, namely, lateral flexibility and longitudinal expansibility. The tension of these springs is such that they act on the two supporting arms to hold the abutments 9 in contact with the frame of the machine. The pivot 6 is so positioned with reference to the extreme outer portion of the arm that it lies on the inner side of said outer portion so that, when that portion of the arm beyond the pivot is engaged by impinging on some object, it will swing on the pivot 6 and expand the springs 13 as shown in Fig. 1. When the supporting arm is free the spring impact members contact and swing the arm back to normal position. The springs also are laterally flexible in the impact members and this reduces the danger to a person hit by the spring portion of the bumper.

What I claim as my invention and desire to secure by Letters Patent is:

1. A bumper comprising a longitudinally expansible impact member, and pivotally mounted supporting arms connected to opposite ends of the impact member, said supporting arms having portions lying outwardly beyond the pivots of the arms so that said outwardly extending portions may move rearwardly and expand the impact member when impinging an object.

2. A bumper comprising a longitudinally expansible and laterally flexible impact member, and supporting arms, each having an abutment for limiting the movement of the arm in one direction, said abutment being held in abutting position by the impact member and being movable away from abutting position when the supporting arm is engaged to expand the impact member.

3. A bumper comprising a longitudinally expansible and laterally flexible impact member, supporting arms for the impact member each pivoted between its ends, one portion extending outwardly from the pivot thence forwardly and thence inwardly into connection with the impact member, and the other portion extending inwardly and rearwardly to cooperate with a suitable abutment.

4. A bumper comprising an impact member, two arms supporting said impact member, and attaching plates to which the arms are pivotally connected, each arm extending outwardly from its pivot and being connected to the impact member, and also extending inwardly and rearwardly from the pivot to cooperate with the frame of a vehicle.

GEORGE REISINGER.